(12) United States Patent
Glover et al.

(10) Patent No.: US 11,341,141 B2
(45) Date of Patent: May 24, 2022

(54) SEARCH SYSTEM USING MULTIPLE SEARCH STREAMS

(71) Applicant: Branch Metrics, Inc., Redwood City, CA (US)

(72) Inventors: Eric J. Glover, Palo Alto, CA (US); Charles Gilliam, Seattle, WA (US); Sarah Jane Burns, Issaquah, WA (US)

(73) Assignee: Branch Metrics, Inc., Pato Alto (GA)

( * ) Notice: Subject to any disclaimer, the term of this patent is extended or adjusted under 35 U.S.C. 154(b) by 112 days.

(21) Appl. No.: 16/984,651

(22) Filed: Aug. 4, 2020

(65) Prior Publication Data

US 2021/0042315 A1 Feb. 11, 2021

Related U.S. Application Data

(60) Provisional application No. 62/883,337, filed on Aug. 6, 2019.

(51) Int. Cl.
*G06F 7/00* (2006.01)
*G06F 16/2455* (2019.01)
(Continued)

(52) U.S. Cl.
CPC ...... *G06F 16/24568* (2019.01); *G06F 16/248* (2019.01); *G06F 40/232* (2020.01); *G06F 40/247* (2020.01)

(58) Field of Classification Search
CPC ............. G06F 16/24568; G06F 16/248; G06F 16/252; G06F 16/2358; G06F 16/2455;
(Continued)

(56) References Cited

U.S. PATENT DOCUMENTS 7,769,767 B2 8/2010 Petersen
9,418,103 B2 8/2016 Shapira et al.
(Continued)

OTHER PUBLICATIONS

Advertising ID—Developer Console Help, Internet Archive—Wayback Machine, https://web.archive.org/web/20161217180225/ https://support.google.com/googleplay/android-developer/answer/ 6048248?hl=en, dated Dec. 17, 2016, accessed on Aug. 6, 2018, 2 pages.
Apple IDFA: A Primer for Marketers, https://apsalar.com/2015/06/ all-about-idfa/, dated Jun. 30, 2015, accessed on Aug. 6, 2018, 4 pages.
(Continued)

*Primary Examiner* — Mohammad A Sana
(74) *Attorney, Agent, or Firm* — RMCK Law Group PLC

(57) ABSTRACT

A method includes receiving a search query from a user device and generating an application name stream query and an original stream query based on the search query. The application name stream query indicates an application name. The original stream query includes the search query. The method includes generating stream metadata for each of the stream queries that indicates a type of the stream query. The application name stream query is an application name type. The original stream query is an original stream type. The method includes, for each stream query, identifying a set of search records and generating a stream result score for each set of search records based on the type of stream query used in identifying the set of search records. Additionally, the method includes selecting a set of search records based on the stream result scores and generating search results based on the selected search records.

24 Claims, 9 Drawing Sheets

(51) Int. Cl.
  *G06F 40/247* (2020.01)
  *G06F 40/232* (2020.01)
  *G06F 16/248* (2019.01)

(58) Field of Classification Search
  CPC .......... G06F 16/2282; G06F 16/24573; G06F 40/247; G06F 40/232
  See application file for complete search history.

(56) References Cited

U.S. PATENT DOCUMENTS

| | | | |
|---|---|---|---|
| 9,619,574 | B2 | 4/2017 | Shapira et al. |
| 9,721,021 | B2* | 8/2017 | Klotz .................. G06F 16/9535 |
| 10,067,752 | B1 | 9/2018 | Dukes et al. |
| 10,091,312 | B1 | 10/2018 | Khanwalkar et al. |
| 10,423,691 | B1 | 9/2019 | Patel et al. |
| 2013/0124309 | A1 | 5/2013 | Traasdahl et al. |
| 2013/0275195 | A1 | 10/2013 | Gabryelski et al. |
| 2014/0129733 | A1 | 5/2014 | Klais |
| 2014/0214916 | A1 | 7/2014 | Gokul |
| 2014/0250106 | A1 | 9/2014 | Shapira et al. |
| 2014/0358887 | A1 | 12/2014 | Morris et al. |
| 2015/0156061 | A1 | 6/2015 | Saxena et al. |
| 2015/0242420 | A1 | 8/2015 | Glover et al. |
| 2015/0295778 | A1* | 10/2015 | Hsiao .................. H04L 43/0894 715/736 |
| 2016/0055133 | A1 | 2/2016 | Look et al. |
| 2016/0142858 | A1 | 5/2016 | Molinet et al. |
| 2016/0147896 | A1 | 5/2016 | Glover et al. |
| 2018/0025086 | A1 | 1/2018 | Malkin et al. |
| 2019/0235919 | A1* | 8/2019 | Barsness .................. G06F 16/25 |
| 2020/0201853 | A1* | 6/2020 | Lappas ............. G06F 16/24545 |

OTHER PUBLICATIONS

Friedenthal, A., "5 Lessons Learned in Site Retargeting," website archived on Dec. 23, 2017, https://web.archive.org/web/20171223134610/https://www.softwareadvice.com/resources/5-lessons-learned-site-retargeting/, accessed on Aug. 28, 2018, 4 pages.

HTTP cookie from Wikipedia, Internet Archive—Wayback Machine, https://web.archive.org/web/20161231030710/https://en.wikipedia.org/wiki/HTTP_cookie dated Dec. 31, 2016, accessed on Aug. 6, 2018, 18 pages.

PCT International Search Report and Written Opinion dated Jul. 26, 2018 for PCT International Application No. PCT/US2018/031375, 12 pages.

PCT International Search Report and Written Opinion dated Nov. 19, 2019 for International Application No. PCT/US2019/049888, 11 pages.

Wikipedia, "Behavioral retargeting," website archived on May 26, 2017, https://web.archive.org/web/20170526165029/https://en.wikipedia.org/wiki/Behavioral_retargeting, accessed on Aug. 28, 2018, 2 pages.

Wikipedia, "Dynamic Creative," website archived on Nov. 21, 2016, https://web.archive.org/web/20161121151105/https://en.wikipedia.org/wiki/Dynamic_creative, accessed on Aug. 28, 2018, 1 page.

Wikipedia, "Site retargeting," website archived on Mar. 27, 2017, https://web.archive.org/web/20170327080616/https://en.wikipedia.org/wiki/Site_retargeting, accessed on Aug. 28, 2018, 1 page.

Williams, H.E., "Query Rewriting in Search Engines," https://hughewilliams.com/2012/03/19/query-rewriting-in-search-engines/, dated Mar. 19, 2012, accessed on Sep. 11, 2020, 5 pages.

* cited by examiner

SEARCH SYSTEM USING MULTIPLE SEARCH STREAMS

CROSS-REFERENCE TO RELATED APPLICATIONS

This application claims the benefit of U.S. Provisional Application No. 62/883,337, filed on Aug. 6, 2019. The disclosure of the above application is incorporated herein by reference in its entirety.

FIELD

The present disclosure relates to providing search results for applications.

BACKGROUND

Software developers can develop websites and applications that are accessed by users on a variety of different platforms, such as different computing devices and operating systems. Example websites/applications may include e-commerce applications, media streaming applications, business review applications, social media applications, and news applications. These applications can provide users with different functionalities for a variety of different entities and verticals. For example, applications in an e-commerce vertical may provide consumer product entities for sale. As another example, applications that provide media streaming functionality may provide access to digital media entities (e.g., movies/songs).

Website and application search engines can search websites/applications for a user. For example, a user can enter a search query into a search engine and receive website and application search results for the search query in a search engine results page (SERP). The search results can include links to web/application pages including products for sale, images, videos, articles, and other types of files.

SUMMARY

In one example, a method comprises receiving a user search query from a user device and generating an application name stream query and an original stream query based on the user search query. The application name stream query indicates an application name. The original stream query includes the user search query. The method comprises generating stream metadata for each of the stream queries that indicates a type of the stream query. The application name stream query is an application name type. The original stream query is an original stream type. The method comprises, for each stream query, identifying a set of search records based on matches between the stream query and data included in the search records. The method further comprises generating a stream result score for each set of search records based on the type of stream query used in identifying the set of search records and selecting one of the sets of search records based on the stream result scores. Additionally, the method comprises generating search results based on the selected search records and sending the search results to the user device. The search results include access data for accessing application states on the user device.

In one example, a system comprises one or more storage devices configured to store a plurality of search records. The system further comprises one or more processing units that execute computer-readable instructions that cause the one or more processing units to receive a user search query from a user device. The one or more processing units are configured to generate an application name stream query and an original stream query based on the user search query. The application name stream query indicates an application name. The original stream query includes the user search query. The one or more processing units are configured to generate stream metadata for each of the stream queries that indicates a type of the stream query. The application name stream query is an application name type. The original stream query is an original stream type. The one or more processing units are configured to, for each stream query, identify a set of search records based on matches between the stream query and data included in the search records. The one or more processing units are configured to generate a stream result score for each set of search records based on the type of stream query used in identifying the set of search records and select one of the sets of search records based on the stream result scores. The one or more processing units are configured to generate search results based on the selected search records and send the search results to the user device. The search results include access data for accessing application states on the user device.

BRIEF DESCRIPTION OF THE DRAWINGS

The present disclosure will become more fully understood from the detailed description and the accompanying drawings.

In the drawings, reference numbers may be reused to identify similar and/or identical elements.

DETAILED DESCRIPTION

Figure 1:
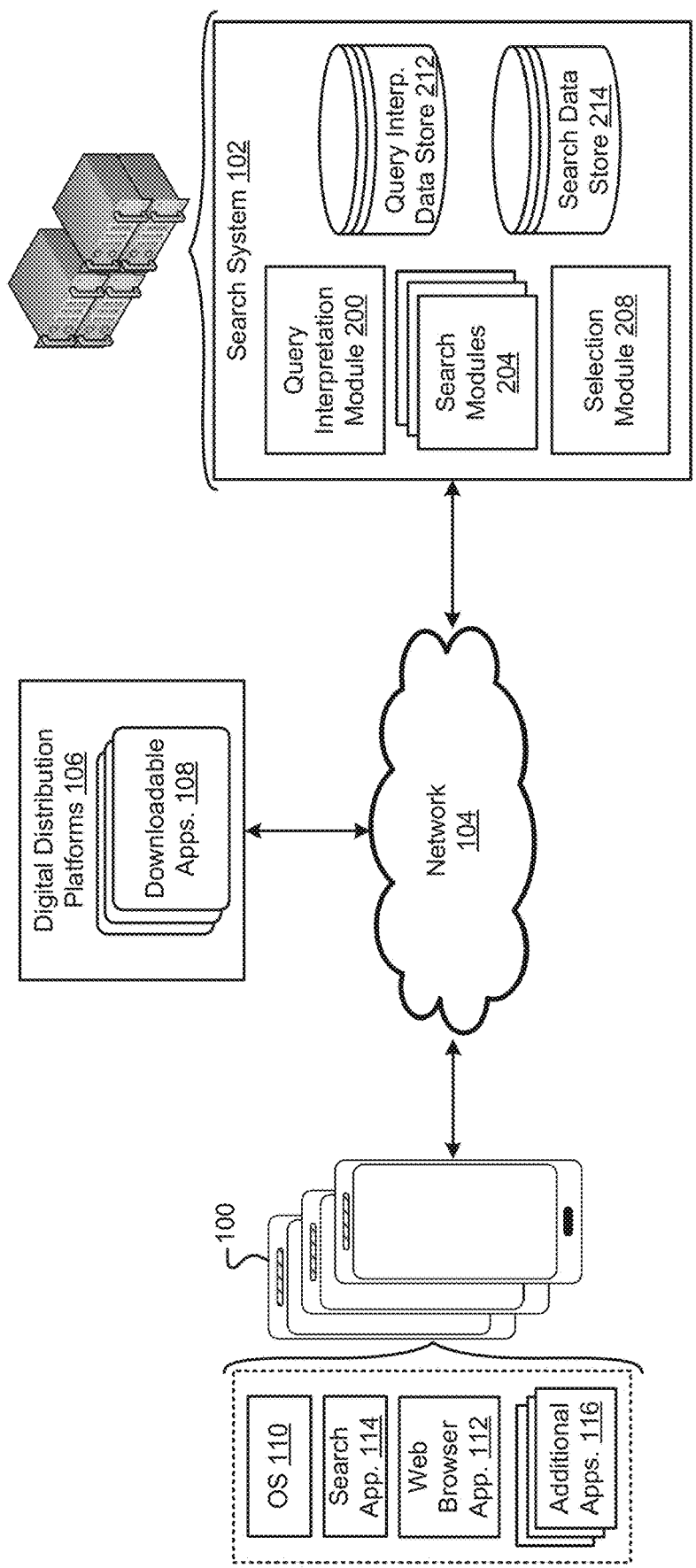
FIG. 1 illustrates an environment that includes an example search system of the present disclosure.

The search system of the present disclosure may receive a user search query and generate a plurality of different query interpretations for the user search query. For example, the search system may generate one or more application name queries and one or more additional queries (e.g., completion queries, spell correction queries, synonym queries, etc.). The search system may perform a search for each of the different query interpretations (e.g., in parallel). Each query interpretation and the subsequent search/processing performed based on the query interpretation may be referred to herein as a "search stream" or a "stream." Each query interpretation may be referred to as a "stream search query" or a "stream query."

Each search may yield a different set of search results (e.g., a different set of search records). The search results yielded from each stream query (e.g., for each stream) may be referred to as a set of "stream search results" or "stream results." The search system may select a set of final search results from the one or more sets of stream results. The search system may select the set of final search results based on a variety of factors including, but not limited to, stream metadata (e.g., stream type), result relevance, result popularity, result type, and user-specific application installation/usage data. The search system may send the final search results to the user device for display (e.g., as a search engine results page). The user may select (e.g., touch/click) a displayed final search result to launch an application to a home state (e.g., an application home page) or other application state (e.g., an application entity page).

Partial user search queries (e.g., incomplete queries) and complete user search queries may be ambiguous. For example, partial user search queries may include some ambiguity because they are only a partial representation of the user's intended search. In another example, partial/complete user search queries may be ambiguous as to their type of desired search results (e.g., application open or entity results) and/or category of results. In another example, users may misspell complete queries, which may then be subject to multiple interpretations. Different users may also provide queries that can be interpreted in different manners. For example, different users may type different queries with the intent of retrieving the same/similar results. As another example, different users may type the same query with the intent of finding different results. The different partial/complete queries for one or more users are not necessarily correct or incorrect. Instead, the queries may be viewed as subject to different interpretations.

The search system of the present disclosure may provide relevant results for partial/complete search queries that are subject to different interpretations. Initially, the search system may generate a plurality of different stream queries (e.g., different query interpretations) that may help ensure that one or more searches for the proper interpretations are performed. Additionally, using post-search knowledge to select the set of final search results from the stream results may help further determine which of the one or more query interpretations are more aligned with the user's intended search. Accordingly, the pre-search generation of streams and the post-search processing of the streams may help ensure that the user's search query (e.g., an ambiguous query) is properly addressed by relevant final search results.

Figure 2:
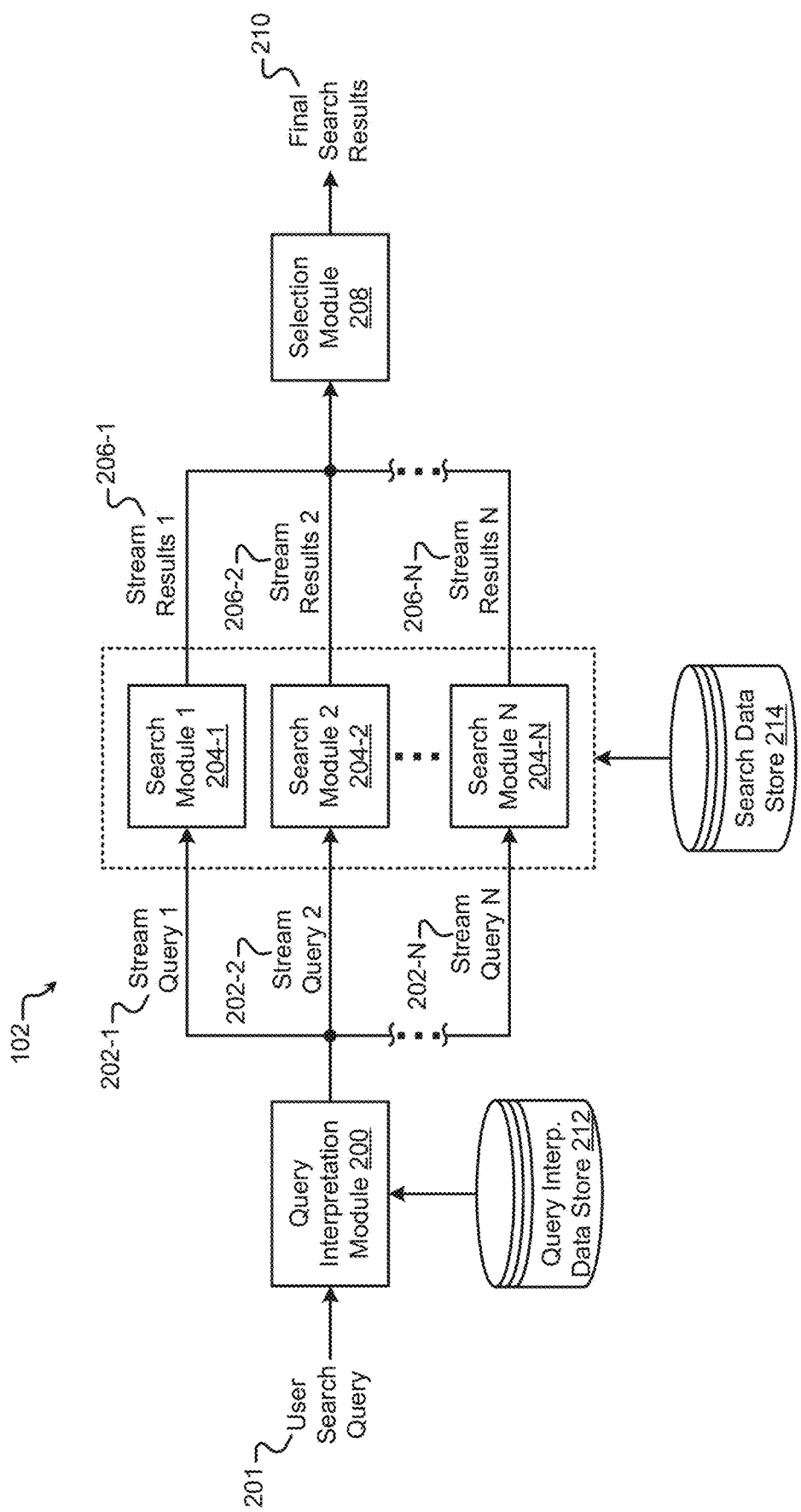
FIG. 2 is a functional block diagram of an example search system.
Figure 3:
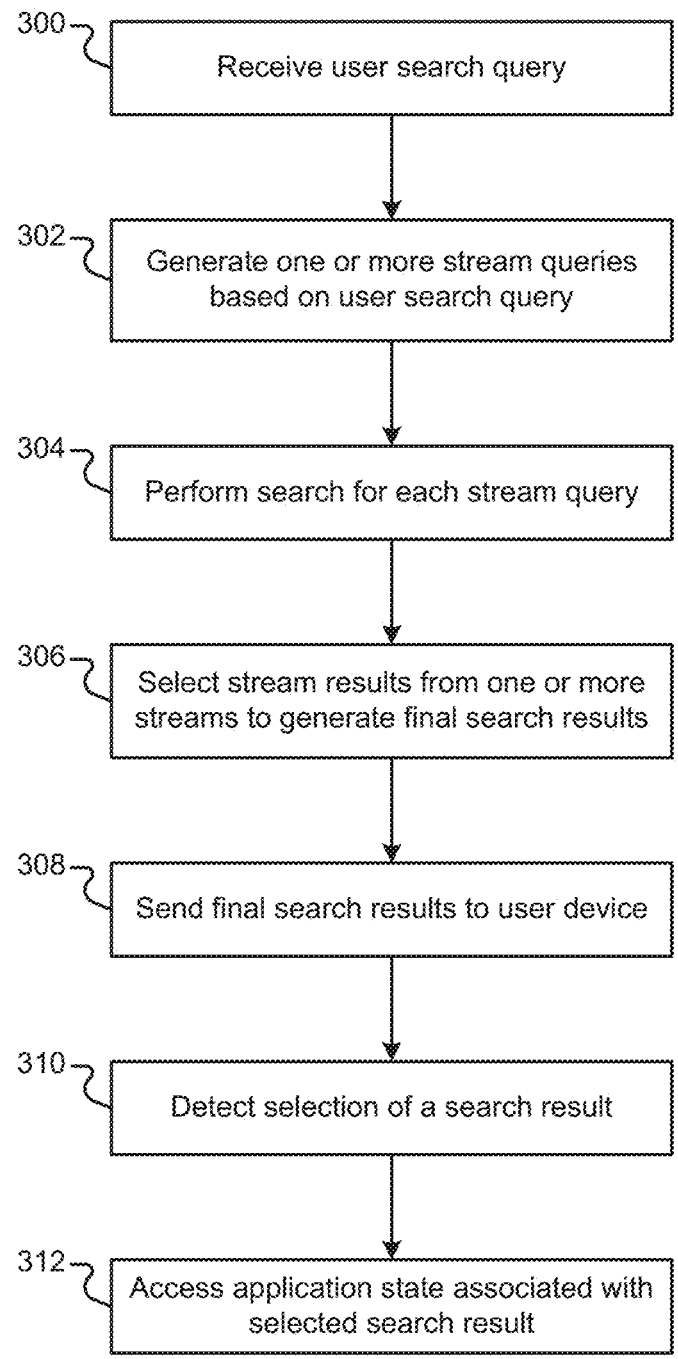
FIG. 3 illustrates an example method that describes operation of a search system and a user device.
Figure 7:
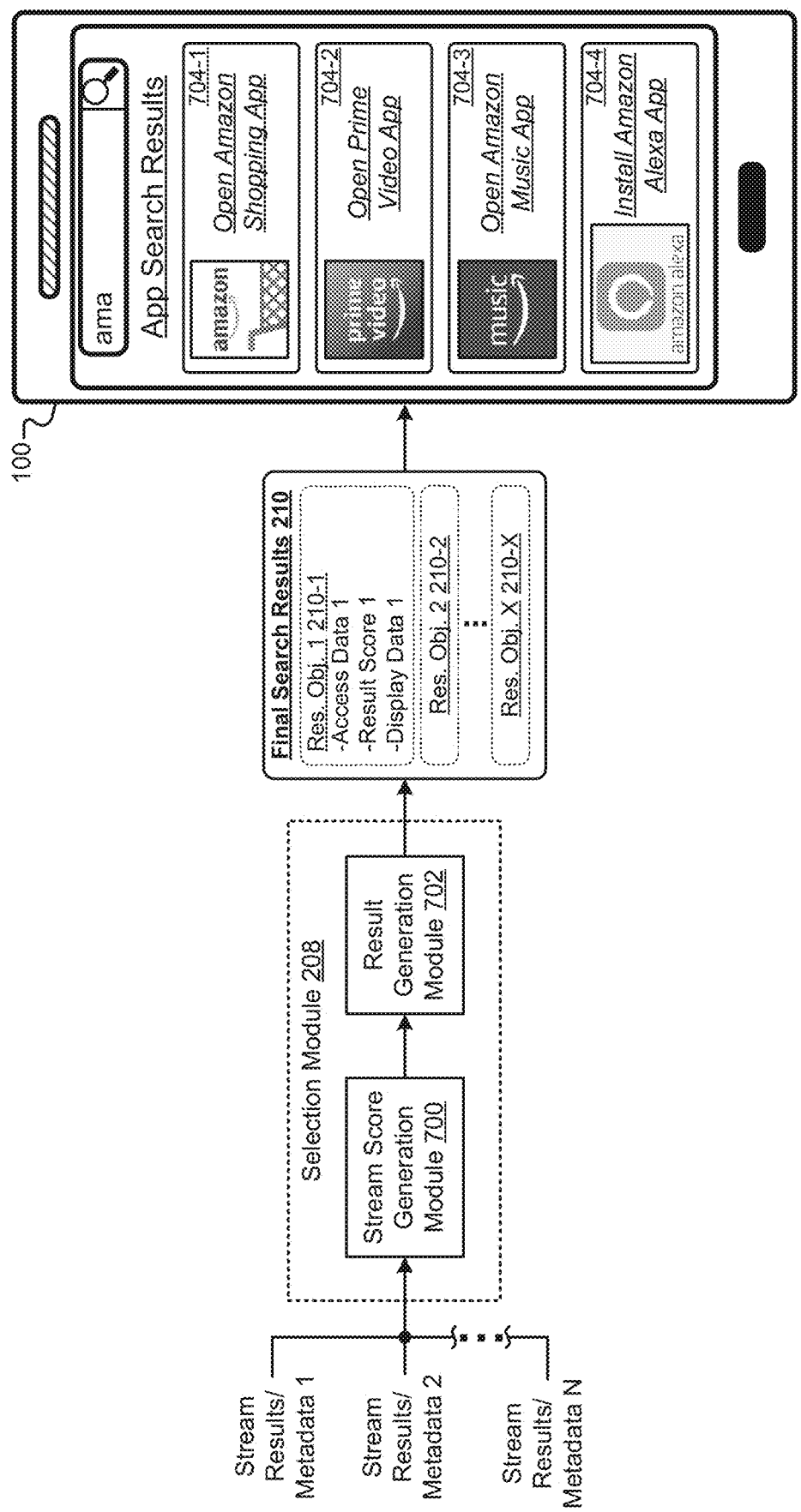
FIG. 7 is a functional block diagram of a selection module that generates search results for rendering on a user device.
Figure 8:
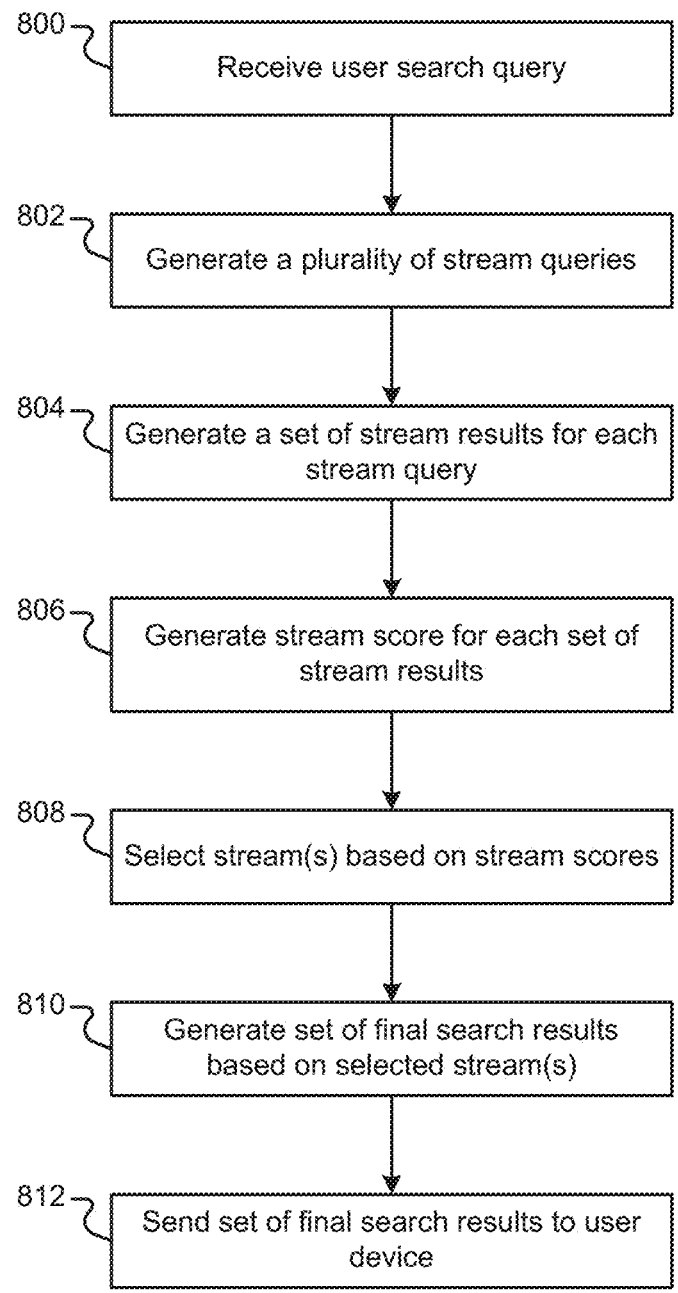
FIG. 8 illustrates a method that describes operation of an example search system.

FIG. 1 illustrates an example environment that includes an example search system that provides search results to user devices. FIGS. 2-3 describe operation of an example search system. FIGS. 4-7 illustrate operation of different components of the search system. FIG. 8 is an example method for generating search results using the different components described with respect to FIGS. 4-7.

FIG. 1 illustrates an environment that includes a plurality of user devices 100 and a search system 102 (e.g., a server computing device) in communication via a network 104. The network 104 may include various types of computer networks, such as a local area network (LAN), wide area network (WAN), and/or the Internet. The search system 102 may receive search queries from the user devices 100. The search system 102 processes the search queries, performs a plurality of searches, and outputs search results to the user devices 100. The search results may include links to application states (e.g., application links) and/or websites (e.g., web links). The application states (e.g., for installed applications) and/or websites may be associated with entities and actions that resolve the user's search query.

The environment includes one or more digital distribution platforms 106. The digital distribution platforms 106 may represent computing systems that are configured to distribute applications 108 to user devices 100. Example digital distribution platforms 106 include, but are not limited to, the GOOGLE PLAY® digital distribution platform by Google, Inc. and the APP STORE® digital distribution platform by Apple, Inc. Users may download the applications 108 from the digital distribution platforms 106 and install the applications on user devices 100.

A user device 100 may include an operating system 110 and a plurality of applications, such as a web browser application 112, a search application 114, and additional applications 116. Example additional applications may include, but are not limited to, e-commerce applications, social media applications, business review applications, banking applications, gaming applications, and weather forecast applications. The search application 114 can communicate with the search system 102. For example, the search application 114 can receive a user search query and make a search request to the search system 102. The search application 114 can display search results received from the search system 102 (e.g., see FIG. 7).

The search application 114 may be implemented on the user device 100 in a variety of ways. In some implementations, the user may download the search application 114 (e.g., from a digital distribution platform 106) and install the search application 114 on the user device 100. In other implementations, the search application may be installed on the user device before the user purchases the user device (e.g., as a preloaded application). In some cases, the search application may be referred to as a "native application" or a "widget." In some implementations, the functionality attributed to the search application herein may be included in other applications, such as a launcher application or as part of a smart assistant device, such as a smart speaker device (e.g., an AMAZON ECHO® smart speaker by Amazon.com, Inc., a GOOGLE HOME® smart speaker by Google, Inc., or an Apple HOMEPOD® smart speaker by Apple, Inc.). In some implementations, the functionality attributed to the search application herein may be implemented as a web-based search accessed using the web browser 112 on the user device.

The user can enter a user search query into the search application 114. The search application 114 generates a search request including the search query and other data. The search request data structure may be referred to herein as a "user search query data object" or a "user search query object." The user search query object may include the user search query (e.g., text/numbers) along with additional user search query data. In some implementations, the search application 114 can acquire context data to include in the user search query object. Context data may include a variety of types of data, such as a user ID, operating system information, device type information, geolocation data, time of day, query history data (e.g., one or more prior queries in the search application), application usage data, user state of motion data (e.g., walking, biking, driving), user-historical context (e.g., all of the above historically), and/or category of the query (e.g., selected in the GUI). In some implementations, the search application 114 can include user-specific data in the user search query object, such as user preferences and/or user historical data associated with the search application 114. Example user-specific data may include, but is not limited to, user demographic data, user geo-location preferences, past queries, and vertical/categorical preferences, such as cuisine preferences or hotel preferences. The search application 114 may store the user-specific data associated with the search application 114. Although the search system 102 is described herein as processing a user search query in some cases, the search system 102 may process the user search query along with additional user search query object data.

The final search results received by the search application 114 can include a variety of data. Data associated with a single search result may be referred to as a "search result data object" or a "search result object." As described herein, a single search result object may include display data, access data, and a result score. The search application may use the display data to render the search result in a graphical user interface (GUI). The display data may include, but is not limited to: 1) the application name, 2) the title of the result (e.g., a restaurant name), 3) a description of the state associated with the result (e.g., a description of a restaurant), and 4) one or more images associated with the application state.

A search result object may also include access data that the user device and/or search application can use to access the application states associated with the search result. An application state may generally refer to a page/screen of an application. In some cases, the access data can include application uniform resource identifiers/locators (URIs/URLs) that launch the application states on the user device. In other cases, the access data can include application metadata that the application can use to access the application state.

A user may access a variety of different application states in different applications. Example applications may include, but are not limited to, e-commerce applications, social media applications, business review applications, banking applications, gaming applications, and weather forecast applications. Similarly, a user may also access such functionality on different webpages of corresponding websites. Different application states and webpages may be associated with different entities. An entity may refer to a person, place, or thing. For example, an entity may refer to a business, product, public figure (e.g., entertainer, politician, etc.), service, media content (e.g., music, video, etc.), or point of interest. In a specific example, if an e-commerce application includes an application state that sells a particular pair of shoes, the pair of shoes may be the entity that is associated with the application state. In another specific example, if a music streaming application provides an application state that plays a particular song, the song may be the entity that is associated with the application state.

The search application may render the search results as user-selectable links that may open applications installed on the user device and access application content within applications and websites. For example, some user-selectable links may access an application home state (e.g., application home page), such as a main page of an application that is typically accessed upon opening the application. As another example, some user-selectable links may access application content states (e.g., pages) for an entity within the application.

The user can select (e.g., touch/click) one of the user-selectable search results in the GUI. The user device 100 can open the application state associated with the search result using the access data included in the received search result. The user may then interact with the accessed application state on the user device. In a specific example, with respect to the YELP® business directory application developed by Yelp, Inc., selecting a YELP® application search result for the Round Table Pizza restaurant may access the Round Table Pizza application state of the YELP® application. If the application is not installed on the user device, the user device may download the application and subsequently access the state associated with the user-selected search result.

The search system 102 may store search records 501 (e.g., see FIGS. 5A-5C) that the search system 102 uses for search. The search records 501 may include data related to application content (e.g., entities), such as searchable data and scoring data associated with application content. The search records 501 may also include display data and access data for generating links to application states. For example, a search record for a specific restaurant in an application may include searchable data associated with the restaurant (e.g., description data), along with a link to the specific restaurant in the application.

FIG. 2 illustrates an example search system 102. The search system 102 includes a query interpretation module 200 (hereinafter "query module 200") that generates stream queries 202-1, 202-2, . . . , 202-N for a single user search query 201. The search system 102 may implement a search module 204 (e.g., search modules 204-1 to 204-N) for each search stream. The search module 204 may generate stream results 206-1, 206-2, . . . , 206-N for each stream query. The search system 102 may also include a selection module 208 that selects a set of final search results 210 from one or more of the stream results 206. The search system 102 may include a query interpretation data store 212 and a search data store 214 that provide data to the modules described herein. In some implementations, the illustrated data stores 212, 214 (or other data stores) may include user data for personalization of query interpretations, search, and/or selection of final search results.

FIG. 3. illustrates an example method that describes operation of the search system 102 of FIG. 2. The method of FIG. 3 is described with respect to the functional block diagram of FIG. 2. In block 300, the search system 102 receives a user search query (e.g., included in a user search query object). In some cases, the user search query may be a query that was entered by a user on a user device. In other cases, the search application may automatically generate a user search query.

In some implementations, the user search query may be a partially entered query. For example, the search application 314 may be configured to send partially entered search queries to the search system 102 as the user is typing the user search query. In some cases, a user search query may be a completed search query that the user has completely typed. In some implementations, the user may interact with a GUI element in the search application (e.g., a search button) that causes the user search query to be sent to the search system 102.

In block 302, the query module 200 generates one or more stream queries 202 based on the received user search query 201. The stream queries 202 may include different interpretations of the user search query 201. In one example, a stream query may include the original user search query. In another example, the query module 200 may generate a first stream query that interprets the user search query as an application name search query. In this example, the query module 200 may generate a stream query that is targeted to surfacing applications (e.g., application opens and installs) in the search results. In another example, the query module 200 may generate one or more additional stream queries that are other types of query interpretations (e.g., completions, synonyms, spell corrections, etc.). In this example, the stream queries may be directed to identifying links to entities within applications, such as a business entity (e.g., a restaurant) or a movie entity.

Each stream may have associated stream metadata that is descriptive of the stream. Different components of the search system 102 may add stream metadata during processing. For example, the query module 200, search modules 204, vertical intent modules 602, and selection module 208 may add stream metadata to the stream. Example stream metadata may be viewed as "pre-search search stream metadata" and "post-search stream metadata," depending on when the stream metadata is generated. The pre-search stream metadata may be generated prior to search (e.g., by the query module 200). The post-search stream metadata may be available after search (e.g., generated by the search/selection module 204, 208). The stream metadata may be used to select stream results for the final search results.

In some implementations, the query module 200 may generate stream metadata for each stream query. Example stream metadata may include stream type data that indicates the type of stream (e.g., query type). Example stream types may include, but are not limited to: 1) an "original stream type" that uses the original search query for the stream query, 2) an "application name stream type" for an application name query type, 3) a "completion stream type" that uses a completion query, 4) a "synonym stream type" for a stream query that uses a synonym, and 5) other stream types described herein. The query module 200 may also generate additional stream metadata associated with the stream query (e.g., stream query metadata). In some implementations, the streams may be processed by the search module 204 and/or selection module 208 based on the associated stream metadata (e.g., stream type). Additional stream metadata may also be added to the streams during processing. In some cases, streams may be grouped by stream type for processing.

The stream types described herein are only example stream types. As such, other stream types with other query interpretations may be generated in other search systems. In some implementations, the stream types may ultimately depend on the type of processing used to generate the stream queries. The processing used to generate the stream queries may vary by implementation of the search system. In some implementations, the search system may implement stream query generation processes that are not readily described with human-readable descriptive stream type names (e.g., application name, synonym, etc.) that are descriptive of the type of processing used to generate the stream queries. As such, although the queries/streams may be assigned descriptive type names herein, other search systems may use other types of query processing than described herein to generate other types of streams. The other types of streams may include descriptive indicators and/or other indicators that are not as clearly descriptive of the processing used to generate the stream query. For example, stream types may be indicated by numerical values that are specific to the stream query generation of the specific search system.

Example query interpretations for the user search query "ama" are now described in turn. The example interpretations may include multiple application name interpretations. For example, the query module 200 may generate application name stream queries for the Amazon Shopping application, the Amazon Music application, the AMAZON PRIME® Video application, and the AMAZON ALEXA® application, all by Amazon.com, Inc. The different application name queries may include the application name in the stream query text in some cases. Additionally, or alternatively, the application name queries may include application identifier (ID) filters that act as search record filters when searching the search data store. In some implementations, there may not be a keyword query (e.g., a requirement for a keyword query). Instead, the search system may select search records for the application ID based on other parameters (e.g., the most popular search records including an application open type). The example interpretations of the user search query "ama" may also include multiple completion queries, such as a content search for the term "amazon." Additional example interpretations may also include synonym searches for "American medical association" and "American motorcyclist association."

In block 304, the search system 102 may perform a search for each stream query. For example, the search system 102 may implement a search module 204 for each stream query. FIG. 2 illustrates search modules 1-N that perform a search of the search data store 214 for each of the stream queries 1-N.

A single search module 204 may generate a set of stream results based on the search records identified during the search. As such, multiple search modules may generate multiple separate sets of stream results. In some implementations, the search system 102 may instantiate the search modules 204 in parallel. In these implementations, the search modules 204 may generate stream results in parallel for later selection by the selection module 208. Generating multiple sets of stream results in parallel may provide an ample selection of relevant results for inclusion into the final search results 210.

Figure 5A:
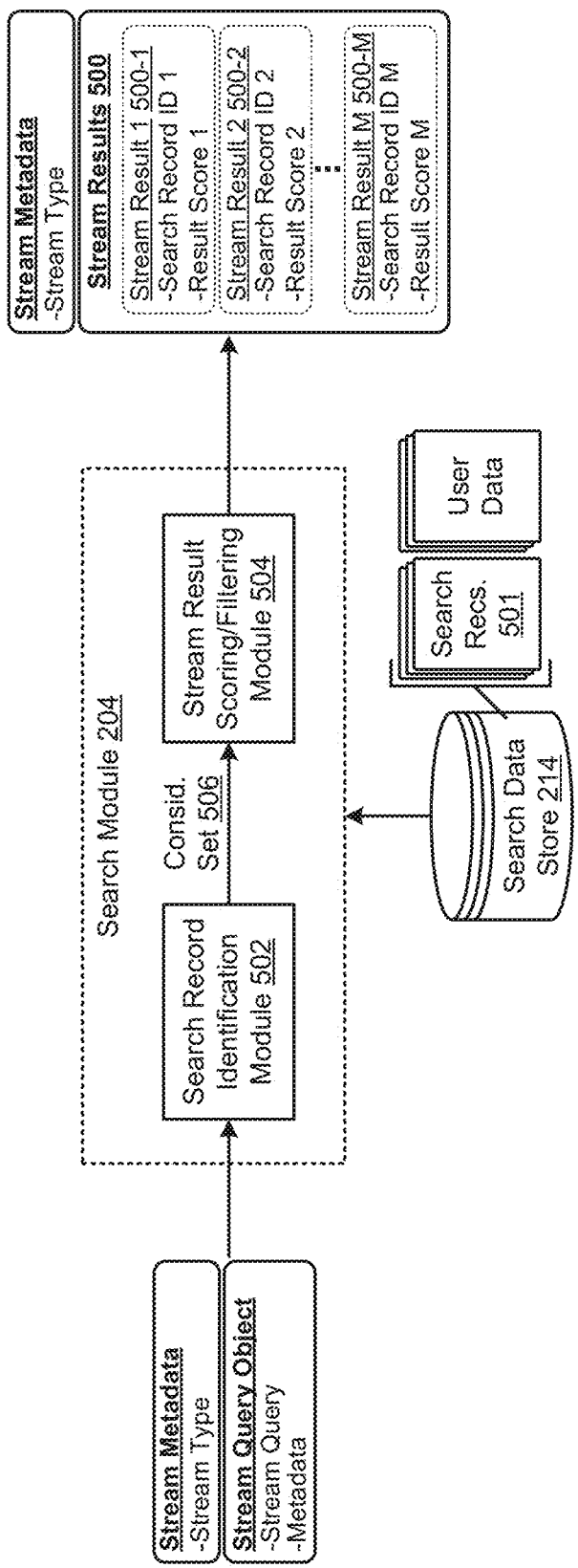
FIG. 5A is a functional block diagram of an example search module.
Figure 5C:
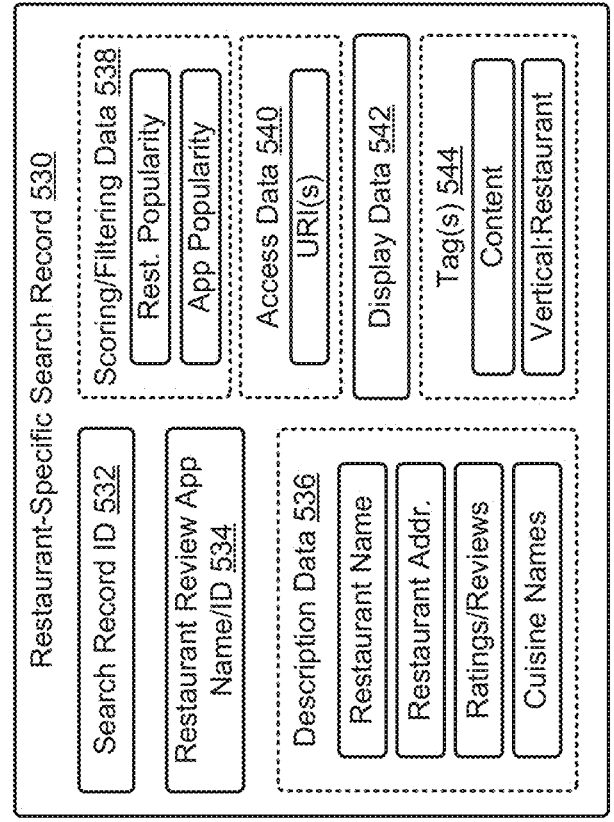
FIGS. 5B-5C illustrate example search records.
Figure 5B:
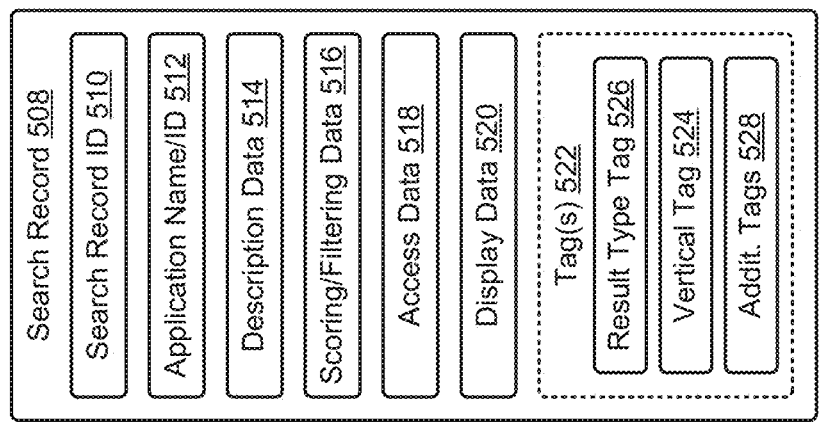

The search data store 214 (e.g., search index) may include a plurality of search records (e.g., see FIGS. 5B-5C). Each search record may include data for an application state. The search data store 214 may include search records for a plurality of applications. Additionally, each application may include one or more application states. As such, the search data store 214 may include a plurality of search records for different application states across a plurality of applications. Each search record may also include access data (e.g., a web URL) for accessing a corresponding webpage, if such a corresponding webpage is available.

The search module 204 may identify and score/filter search records based on a variety of data. For example, the search module 204 may identify and score/filter search records based on matches between data included in the stream query object and the search record, such as matches between text of the stream query and the search record. The search module 204 may also score/filter identified search records based on data associated with the search records, such as scoring features included in the search records. In some implementations, the search module 204 may also identify and score/filter search records based on user data, such as installed apps and previous engagement with the applications. The search module 204 may generate a result score for each stream result. The result score may indicate the relevance of the stream result to the stream query.

In block 306, the selection module 208 selects stream results 206 to include in the set of final search results 210. The selection module 208 may select stream results from one or more of the search streams to generate the final search results 210. For example, the selection module 208 may selection one or more entire sets of stream results for inclusion in the final search results. As another example, the selection module 208 may selection a subset of stream results from one or more streams for the final search results. In a specific example, the selection module 208 may select a best set of stream results (e.g., a highest scoring stream) and include the stream results from the best set into the final search results.

The selection module 208 may select streams based on one or more selection factors. Example selection factors may include any of the data associated with the search streams (e.g., stream metadata) and individual stream results described herein. Example selection factors may include, but are not limited to: 1) a number of results in a stream, 2) popularity of the results in a stream, 3) stream result scores of search results in the stream, 4) stream metadata (e.g., stream type), 5) vertical intent scores (e.g., see FIGS. 6), and 6) stream scores assigned to the streams. In some implementations, the selection module 208 may also select streams/results based on other criteria described herein, such as personalization considerations, a maximum number of final results, and/or other filtering/preference rules.

In some implementations, the selection module 208 may generate a stream score for each stream. The selection module 208 may generate the stream score based on any of the selection factors. The selection module 208 may select stream results based on the stream scores associated with the stream results. In some implementations, the selection module 208 may be configured to select the highest scoring stream (e.g., the highest stream score) and use the stream results from the highest scoring stream as the set of final search results. In some implementations, the selection module 208 may be configured to select multiple high scoring streams, such as the top scoring streams, to include in the set of final search results. For example, the selection module 208 may be configured to select the stream results from the highest scoring streams until reaching a threshold number of results for the final search results. Although the selection module 208 may select entire sets of stream results, in some implementations, the selection module 208 may be configured to select individual results from multiple different streams. For example, the selection module 208 may select individual results from the highest scoring streams based on individual result data (e.g., relevance scores, popularity scores, etc.).

In block 308, the search system 102 (e.g., selection module 208) generates the final search results and sends the final search results to the user device. The search system 102 may generate the final search results based on the search records selected by the selection module 208. For example, the search system 102 may generate the search results using the display data and the access data from the selected search records. The final search results may include a plurality of result data objects.

The user may select (e.g., touch/click) any of the displayed search results to access the corresponding application state. In block 310, the user device 100 (e.g., search application 114) detects selection of a displayed search result. In block 312, the user device 100 accesses that application state associated with the selected search result. For example, the user device 100 may use the state access data to access the state associated with the selected search result.

Processing of example queries "piz," "star buck," and "amazo" by the search system 102 are now described in turn. In one example, for the user search query "piz," the user may intend to find search results for pizza restaurants near them. The completion stream for the stream query "pizza" may produce a large number of pizza restaurant vertical (e.g., category) results with high relevance, popularity, and vertical intent (e.g., see FIG. 6). The original query stream for the stream query "piz" may produce low relevance and low popularity results from different verticals. Similarly, an application name query based on the query "piz" may not identify high quality application results. In this case, the search system 102 may select the completion stream for the "pizza" stream query.

In another example, for the user search query "star buck," the user may intend to find search results for Starbucks coffee shops near them. The spell correction stream for the stream query "starbucks" may produce a large number of coffee shop vertical (e.g., category) results with high relevance, popularity, and vertical intent (e.g., see FIG. 6). The original query stream for the stream query "star buck" may produce low relevance and low popularity results from different verticals. An application name stream may use a query interpretation that identifies the Starbucks application using an application ID filter, which may yield some quality results for opening the Starbucks application. In this case, the search system 102 may select the stream for the "starbucks" and/or the Starbucks application stream queries.

In another example, for the user search query "amazo," the user may intend to find search results that open applications from Amazon.com, Inc. The query module 200 may produce application name queries for Amazon applications, such as Amazon Shopping, Amazon Music, Amazon Prime Video, and Amazon Alexa. The Amazon applications may have high relevance and popularity scores for the application intent queries. A completion of "amazo" (e.g., to "amazon" and others) may also produce some quality results, but from different verticals. The original query stream for the stream query "amazo" may produce low relevance and low popularity results from different verticals. In this case, the search system 102 may select the application name stream and/or the completion stream, depending on the configuration of the search system 102. A similar outcome may also be obtained for user search queries of "fb," "fac," and "faceb," where a user intends to find search results that open the FACEBOOK® application. FIG. 7 illustrates an example interface in which the Amazon applications are selected as results for a similar query "ama."

Figure 4:
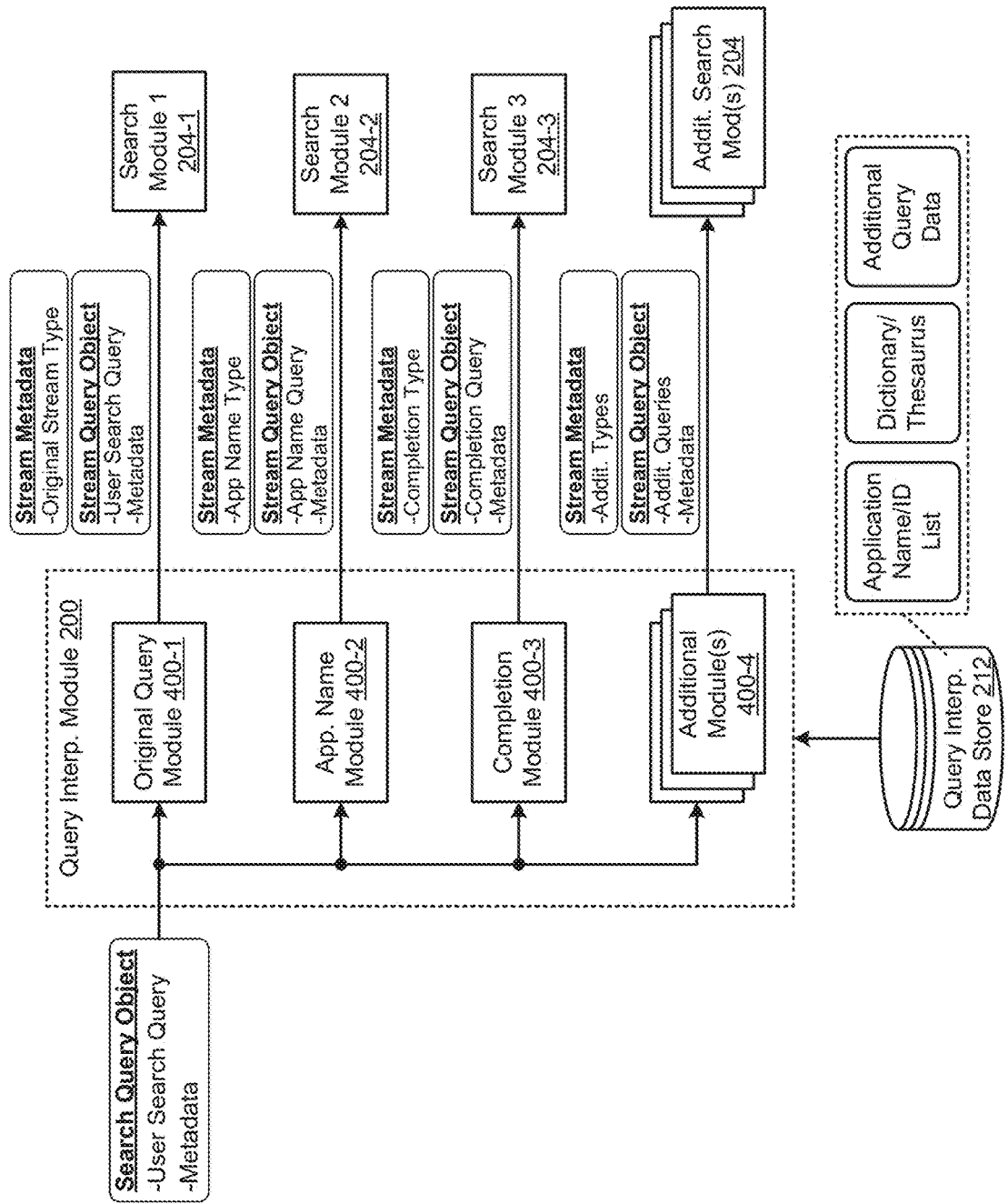
FIG. 4 is a functional block diagram of an example query interpretation module.

FIG. 4 illustrates an example query module 200 that generates stream queries based on a received user search query. A query module 200 includes a plurality of query sub-modules 400-1, 400-2, 400-3, 400-4 that each may generate one or more stream queries and associated stream query metadata. Example sub-modules 400 in FIG. 4 include an original query module 400-1, an application name module 400-2, a completion module 400-3, and additional modules 400-4. Each query sub-module 400 may generate one or more stream queries. Although sub-modules 400 may generate one or more stream queries, in some cases, a sub-module 400 may refrain from generating a stream query for a received user search query.

The query sub-modules 400 may include different query parsers that translate the user search query object into a stream query data object (referred to also as a "stream query object"). As described herein, the user search query object may refer to a data object that includes "user search query text" (i.e., a "user search query") and user search query metadata. The user search query metadata may include a plurality of data fields associated with the search query, such as context data described herein. The stream query data object may refer to a data structure that includes "stream query text" (i.e., a "stream query") and other stream query metadata. The stream query metadata may include a plurality of data fields associated with the stream query. For example, the stream query metadata may include similar data as user search query metadata, along with other data added by the search system (e.g., a confidence score). The stream query metadata may be a subset of the overall stream metadata.

The different stream query data objects may have different stream query text and/or different stream query metadata. For example, different query sub-modules 400 may generate stream query metadata with different fields. Additionally, or alternatively, the different query sub-modules 400 may generate stream query metadata that has different data included in the data fields. In some implementations, the stream query metadata may be configured for use by the search module 204 and/or the selection module 208. For example, the stream query metadata may include fields for an application ID, different search database constraints/filters, and geolocation data. Other example fields may include, but are not limited to, an original query field that includes the original user search query, stream query confidence scores that indicate a level of confidence that the interpretation of the user search query is accurate, and categorical filters that indicate a category associated with the query.

The search system 102 may include a query interpretation data store 212 ("query data store 212") that query module 200 may use to generate the stream queries and/or stream query metadata. For example, the different parsers associated with the query sub-modules 400 may use the data included in the query data store 212 to generate the stream queries and stream query metadata.

The different query sub-modules 400 may generate stream queries/metadata that are different interpretations of the user search query. For example, the different query sub-modules 400 may generate different stream queries for the different query interpretations. As another example, the different query sub-modules 400 may generate different stream query metadata. In some cases, a single query sub-module may generate multiple query streams that differ from one another in stream query text and/or stream query data fields. In some cases, different streams may have the same stream queries, but different stream query metadata.

In some implementations, query sub-modules 400 may also assign stream type metadata to a stream. For example, the query sub-modules 400 may assign a stream type to each stream that indicates the type of query interpretation (i.e., stream query type). In some implementations, each sub-module 400 may assign its own stream type value to the stream. The stream type value may be unique to the query sub-module in some cases. Example stream types described herein correspond to the different interpretations. For example, an application name module may assign an application name query type to an application name stream. As another example, an original query module may assign an original stream type to an original query stream. As another example, a completion module may assign a completion stream type to a completion query stream. As another example, a spell correction module may assign a spell correction stream type to a spell correction stream. Other example stream types may include, but are not limited to, synonym stream types and search link stream types.

The example query module 200 of FIG. 4A includes an original query stream module 400-1, an application name module 400-2, a completion module 400-3, and additional modules 400-4. The example sub-modules 400 may generate one or more stream queries as described herein. Example operation of the sub-modules 400 are now described in turn.

The original query module 400-1 may generate a stream query that uses the original user search query in an unmodified fashion. Accordingly, the stream query generated by the original query module 400-1 may be the same query as the user search query. The original query module 400-1 may generate additional data for the stream query. For example, the original query module 400-1 may assign an original stream type to the stream query along with any other user search query metadata.

The application name module 400-2 may generate a stream query that is an application name interpretation of the user search query. The application name stream query may be configured to surface search results associated with a specific application. For example, the application name stream query may be configured to surface search results for opening a specific application and/or identifying entities within the specific application.

In some implementations, the application name query may be configured as an application name search. For example, the application name query may include an application name/ID in the query text and/or the terms "application" or "app." Such query text may cause the search module 204 to surface results that are specific to the application. Additionally, or alternatively, the application name query may include a specific application ID in an application ID data field in the stream query metadata. The specific application ID in the stream query metadata may cause the search module 204 to identify search records associated with the specific application ID. In some cases, the application ID data field in the stream query metadata may be used as a filter by the search module 204 to limit the search to the specific application associated with the application ID.

The application name module 400-2 may use data in the query data store 212 to generate the application name stream query. In some implementations, the query data store 212 may include an application name/ID list that includes partial/complete user queries that map to application names/IDs. In these implementations, the application name module 400-2 may match partial/complete user queries to specific application names/IDs in the query data store 212. The application name module 400-2 may use the specific application names/IDs from the query data store 212 to generate the application name stream queries.

In some cases, a user may also enter a partial/complete query that indicates the user would prefer an application name search. For example, a user may enter the word "application" as a partial query (e.g., "ap," "app," or "appl") or complete query. The application name module 400-2 may be configured to identify the partial/complete form of the word "application," and generate an application name stream query for an application corresponding to the additional user search query text. In a specific example, if the user types "yelp app," the application name module 400-2 may generate an application name query for the YELP® application, such as a stream query "Yelp" and/or stream query metadata including a Yelp application ID search filter.

The application name module 400-2 may generate multiple application name stream queries for a single received user search query. Each individual application name stream query may be for a different application name. The application name module 400-2 may also assign stream type metadata to each of the streams. For example, the application name module may assign an "application name type" to each stream associated with the application name stream queries.

A completion module 400-3 may generate a stream query that is a completion of a partially entered user search query. A completion stream query may refer to a content-based autocompletion query (e.g., a predictive query) that is generated with the intent to search for content within applications. For example, the completion stream query may be used as a keyword database query during search. In some implementations, a completion query may be generated based on a predefined set of partial user search queries that are mapped to one or more completed queries.

The completion module 400-3 may generate multiple completion stream queries for a single received user search query. Each individual completion stream query may be for a different completed stream query. The completion module 400-3 may also assign stream type metadata to each of the streams. For example, the completion module 400-3 may assign a "completion type" to each stream associated with the completion stream queries.

A spell correction module (not illustrated) may generate a stream query that is a spell correction interpretation of the user search query. A spell correction stream query may be configured to surface search results associated with an alternate/correct spelling of the user search query. Spell corrections may be based on mappings between user search query text and correct spellings for stream queries. Spell correction may be accomplished using dictionary-based data, past user query data, or other spell correction data.

The spell correction module may generate multiple spell correction stream queries for a single received user search query. Each individual spell correction stream query may be for a different spell correction. The spell correction module may also assign stream type metadata to each of the streams. For example, the spell correction module may assign a "spell correction type" to each stream associated with the spell correction stream queries.

A synonym module (not illustrated) may generate a stream query that is a synonym interpretation of the user search query. A synonym stream query may be configured to surface search results associated with a synonym of the user search query. In some cases, synonyms may include acronyms and/or the full acronym interpretation. The synonym stream queries may be based on mappings of user search queries to one or more potential synonyms. In some implementations, synonym generation may be accomplished using thesaurus-based data.

The synonym module may generate multiple synonym stream queries for a single received user search query. Each individual synonym stream query may be for a different synonym. The synonym module may also assign stream type metadata to each of the streams. For example, the synonym module may assign a "synonym type" to each stream associated with the synonym stream queries.

The query module 200 may include an application-specific query module (not illustrated) that may generate application-specific search queries. An application-specific search query may include query text along with an indicator that specifics that the search be performed for a specific application. The presence of a partial/complete application name along with other query text may trigger generation of an application-specific stream query. An example user search query that may trigger generation of an application-specific search query may include the user search query "yelp pizza." In this example, an application-specific query module may generate a stream query object for the stream query text "pizza" that is limited to the YELP® application (e.g., using an application ID filter). The application-specific query module may generate multiple stream queries for a single received user search query. Each individual stream may be assigned a "search link" type.

In some implementations, the query module 200 may generate a confidence score for each of the generated stream queries. The confidence score may indicate a level of confidence that the interpretation of the user search query is accurate. For example, the confidence score may indicate a probability that the stream query is a valid interpretation of the user search query. The query confidence score may be used for later processing, such as selecting which stream queries to search and selecting which stream/results to include in the final search results.

In some implementations, each of the sub-modules 400 may be configured to generate stream queries (e.g., a predetermined number of stream queries) for each user search query. In some implementations, the sub-modules 400 may be configured to determine whether to generate stream queries. For example, a sub-module 400 may be configured to generate stream queries when the associated confidence score is greater than a threshold value.

In some implementations, the query module 200 may be configured to have rules for keeping generated stream queries for later use in search. For example, the query module 200 may output a threshold number of stream queries that have greater than a threshold confidence value. The query module 200 may also implement other rules/logic to make the selection of which stream queries to generate. In some implementations, the query module 200 may preferentially select specific stream query types ahead of other query types. In some implementations, the query module 200 may generate an initial set of stream queries and then reduce the size of the set based on processing considerations. For example, the query module 200 may keep stream queries that are cheaper/faster to search (e.g., to reduce search overhead).

In some implementations, the search system 102 may be configured to perform conditional execution of stream queries, where the search system 102 executes a single stream with a first stream query (e.g., a highest confidence score) and evaluates the stream results. In cases where the stream results are unsatisfactory (e.g., a low relevance and/or popularity), the search system 102 may use a next best stream query (e.g., a next highest confidence score). In cases where the results are satisfactory (e.g., based on relevance and popularity), the search system 102 may use the satisfactory results as the final set of search results.

FIG. 5A illustrates an example search module 204 that generates stream results 500 (e.g., stream results 500-1 to 500-M) based on a received stream query data object. The search module includes a search record identification module 502 ("identification module 502") and a stream result scoring and filtering module 504 ("result scoring module 504"). The identification module 502 may identify a set of search records in the search data store 214 based on the stream query (e.g., using a database query). The identified search records may be referred to as a consideration set of search records 506 ("consideration set 506"). The result scoring module 504 may score and/or filter the search records in the consideration set 506.

FIG. 5B illustrates an example search record 508 that may be identified and scored/filtered by the identification module 502 and the result scoring module 504. The search record 508 of FIG. 5B may include data associated with an application state, such as an application open state or other application states for specific content within an application. The search data store 214 (e.g., a search index) may include a plurality of search records that include similar information for application states.

The search record 508 may include a search record ID 510 that identifies (e.g., uniquely identifies) the search record 508 among other search records 501 in the search data store 214. In some implementations, the search record ID 510 may include the access data (e.g., URI/URL) for accessing the application state associated with the search record 508. The search record 508 may include an application name/ID 512 that identifies (e.g., uniquely identifies) the application associated with the search record 508. For example, the application name/ID 512 may indicate the application that includes the application state that is described and accessed by the data included in the search record 508.

The search record 508 includes description data 514. The description data 514 may include text/numbers that are associated with the application state, such as text/numbers acquired (e.g., crawled/scraped) from the application state, keywords associated with the application, etc. In some implementations, the description data 514 may include geolocation data, such as a postal address and/or geolocation coordinates (e.g., latitude/longitude). Example description data for an application state and/or webpage may include, but is not limited to, a brief description of the entity associated with the application state (e.g., a business, movie, song, etc.), user reviews, rating numbers, and business hours.

The search record 508 may include scoring/filtering data 516. The scoring/filtering data 516 may include values that are used by the search module 204 (e.g., result scoring module 504) to score the search records during search. Example scoring values may include, but are not limited to, popularity scores, review numbers, rating numbers, aggregate usage values, and application download numbers. Popularity scores may indicate the popularity of the application and/or the popularity of the application state. Aggregate usage values may include data indicating a number of times a plurality of uses accessed the application state over a period of time (e.g., daily/monthly). The aggregate usage values may include aggregate values for different geolocations (e.g., cities, states, countries), languages, device types, operating systems, times of day, days of week, and other combinations of parameters.

In some implementations, the search system 102 may determine popularity scores for applications and/or application states based on aggregate usage data, such as aggregate usage values that indicate a number of times the application was downloaded and/or the number of times the application state was accessed. The popularity scores may be values that are calculated relative to other applications and application states. For example, an application popularity score may indicate a number of times an application was downloaded relative to other applications. As another example, an application state popularity score may indicate a number of times an application state was accessed relative to other application states in the application and/or other applications. In some implementations, the search record 508 may include a plurality of popularity scores for the application/state (e.g., popularity scores for different countries, languages, etc.).

The search record 508 may include access data 518 (e.g., application URI/URLs) for accessing the application state associated with the search record 508. The access data 518 may be used by the user device and/or search application to access the application states associated with the search result. In some cases, the access data 518 can include application metadata that the application can use to access the application state. Example application metadata used to access an application state may include application-specific entity IDs, such as a numeric code used to represent a business in a business review application. In some implementations, the access data 518 may also include web access data, such as a web URL, for accessing a webpage that corresponds to the application state (e.g., a webpage that includes the same/similar information as the application state). Additionally, in some implementations, the access data 518 may include a download link for downloading the application from the digital distribution platform in the case the application is not installed on the user device.

The search record 508 may include display data 520. The display data 520 may include text and/or images for rendering a search result on the user device. For example, the display data 520 may include, but is not limited to: 1) the application name, 2) the title of the result (e.g., a business name), 3) a description of the application state associated with the result (e.g., a description of the business), and 4) one or more images associated with the application state.

The search record 508 may include a plurality of tags 522. For example, the search record 508 may include a vertical tag 524 (e.g., category) associated with the application state. For example, the vertical tag 524 may describe the category of the content (e.g., entity) associated with the search record 508. Example verticals may include, but are not limited to, points of interest (e.g., restaurants, businesses, attractions, museums), music (e.g., music videos, songs, and artist pages), business types (e.g., hotels), social (e.g., social media content), and news. In some examples, verticals can have sub-verticals (i.e., sub-categories). In some cases, the search system operator may define the verticals applied to the search records 501. Each application can be associated with one or more verticals. For example, the YELP® application may have verticals for hotels and restaurants. In this example, each of the search records (e.g., entities) can be associated with a vertical tag (e.g., one vertical per entity). For example, a hotel in the YELP® application (e.g., the link to the hotel) may be associated with a hotel vertical. Similarly, a restaurant in the YELP® application (e.g., the link to the restaurant) may be associated with the restaurant vertical. Although a search record may include a single vertical tag, in some implementations, a search record may include a plurality of verticals and/or one or more sub-verticals (e.g., sub-categories).

The search record 508 may include a result type tag 526 that indicates a type of search result generated based on the search record 508 (e.g., the application state accessed by the access data). One example result type tag may be an application open result. An application open tag may indicate that the search record may produce a search result that opens an application to an application homepage. Another example result type tag may be an application content tag. An application content tag may indicate that the search record may produce a search result that opens an application to specific content provided by the application, such as an application state that provides data for one entity (e.g., a business) among a plurality of other entity application states within the application. Other example result type tags may be application feature tags that access general features (e.g., actions) provided by the application. For example, application feature tags may include a "compose email" tag for a search record that starts a new email in an email application. Another example application feature tag may include a "view cart" tag for a search record that views a cart in a shopping application. The search record 508 may also include one or more additional tags 528.

Although some search records may include similar data fields as those illustrated in FIG. 5B, different search records may have different data fields. For example, different search records associated with different entity types/verticals may have different data fields. In a specific example, a search record for a movie entity in a streaming application may include a movie name, actor names, a movie genre, and a release date. As another specific example, a search record for a restaurant entity in a restaurant review application may include cuisine names, restaurant reviews, and ratings. The search records described herein are only example search record data structures. As such, a search system may implement the techniques of the present disclosure using additional/alternative data structures and data stores.

FIG. 5C illustrates an example search record 530 for a specific restaurant entity in a restaurant review application that provides customer reviews for restaurants. The example search record 530 includes the fields described with respect to the search record 508. For example, the example search record 530 includes a search record ID 532 and an application name/ID 534. The application name is the "Restaurant Review Application." The example search record 530 includes description data 536 for the specific restaurant, such as the restaurant name, restaurant address, customer ratings/reviews, and cuisine names. The example search record 530 also includes scoring/filtering data 538, such as a restaurant popularity score for the application state and an application popularity score for the Restaurant Review Application. The example search record 530 also includes access data 540 (e.g., URIs) and display data 542 for the application state. The tags 544 may include a "content" tag that indicates the search result type is an application content type. The tags also include a vertical tag that indicates the search record is associated with a restaurant vertical.

Referring back to FIG. 5A, the identification module 502 may identify the consideration set 506 based on matches between data in the stream query object and data included in the search records 501. For example, the identification module 502 may identify the consideration set 506 based on text matches between the stream query and one or more fields in the search record, such as text in the description data field, the application name/ID field, and/or the tags. In some implementations, the identification module 502 may generate preliminary scores based on how well the stream query object (e.g., stream query) matches the search record (e.g., description data). In some implementations, the matches may be weighted (e.g., based on the type of data field matched).

The result scoring module 504 may further score and/or filter the search records in the consideration set 506. For example, the result scoring module 504 may generate a result score for each of the search records in the consideration set 506. The result score for a search record may indicate the relative rank of the search record among other search records in the stream. For example, a larger result score may indicate that a search record is more relevant to the stream query. In some implementations, the result scores may be decimal values from 0.00 to 1.00, where a score closer to 1.00 may indicate that the result is more relevant. The search system 102 and/or search application 114 may rank the search results in the GUI based on result score. For example, higher scoring search results may be ranked higher in the search engine results page.

The result scoring module 504 may generate result scores in a variety of different ways. In some implementations, the result scoring module 504 may generate a result score for a search record based on one or more scoring features. The scoring features may be associated with the search record and/or the stream query object. Example scoring features associated with the search record may include popularity values, aggregate data values, ratings, etc. Example scoring features associated with the stream query object may include a confidence score and geolocation of the user. The scoring module 504 may determine a result score based on one or more of the scoring features listed herein and/or additional scoring features not explicitly listed.

In some implementations, the result scoring module 504 may include a scoring function. For example, the scoring function may generate result scores based on a plurality of scoring features. In some implementations, the result scoring module 504 may include one or more machine learned models (e.g., a supervised learning model) configured to receive one or more scoring features and output result scores.

In some implementations, the result scoring module 504 may personalize the results by generating result scores based on user data. For example, the result scoring module 504 may score/filter the stream results based on the installation status of the applications for the user and/or the application usage frequency for the user. In one example, the result scoring module 504 may boost stream result scores for applications that are installed and/or used by the user. In another example, the result scoring module 504 may remove stream results for applications not installed on the user device.

In some cases, the search module 204 may identify and score a dynamic search record. A dynamic search record may include instructions for completing a search link that is configured to search a specific application. In these cases, the search module 204 may complete a search link based on the dynamic search record. In a specific example, the search module 204 may use a partial/complete query to complete an application-specific search link that is configured to open the application and perform a search for the partial/complete query.

A multi-vertical search system may provide search results for a plurality of different verticals. In some searches, some verticals may be associated with high quality results that are relevant to the user search query, while other verticals may be associated with poor results that are not as relevant to the user search query. The search system 600 of FIG. 6 (e.g., vertical intent modules 602) may calculate a vertical intent score for each stream that may be used to help identify streams that have high quality results that align with a vertical.

A vertical intent score may indicate the likelihood that the stream results align with the user's search intent. For example, a high vertical intent score may indicate that the stream results are a valid interpretation of the user's search query (e.g., the results align with the user's search intent). The vertical intent score may provide a good cross-content value for comparing streams. As such, the vertical intent score may be used as a signal for selecting a stream for inclusion in the final search results.

Figure 6:
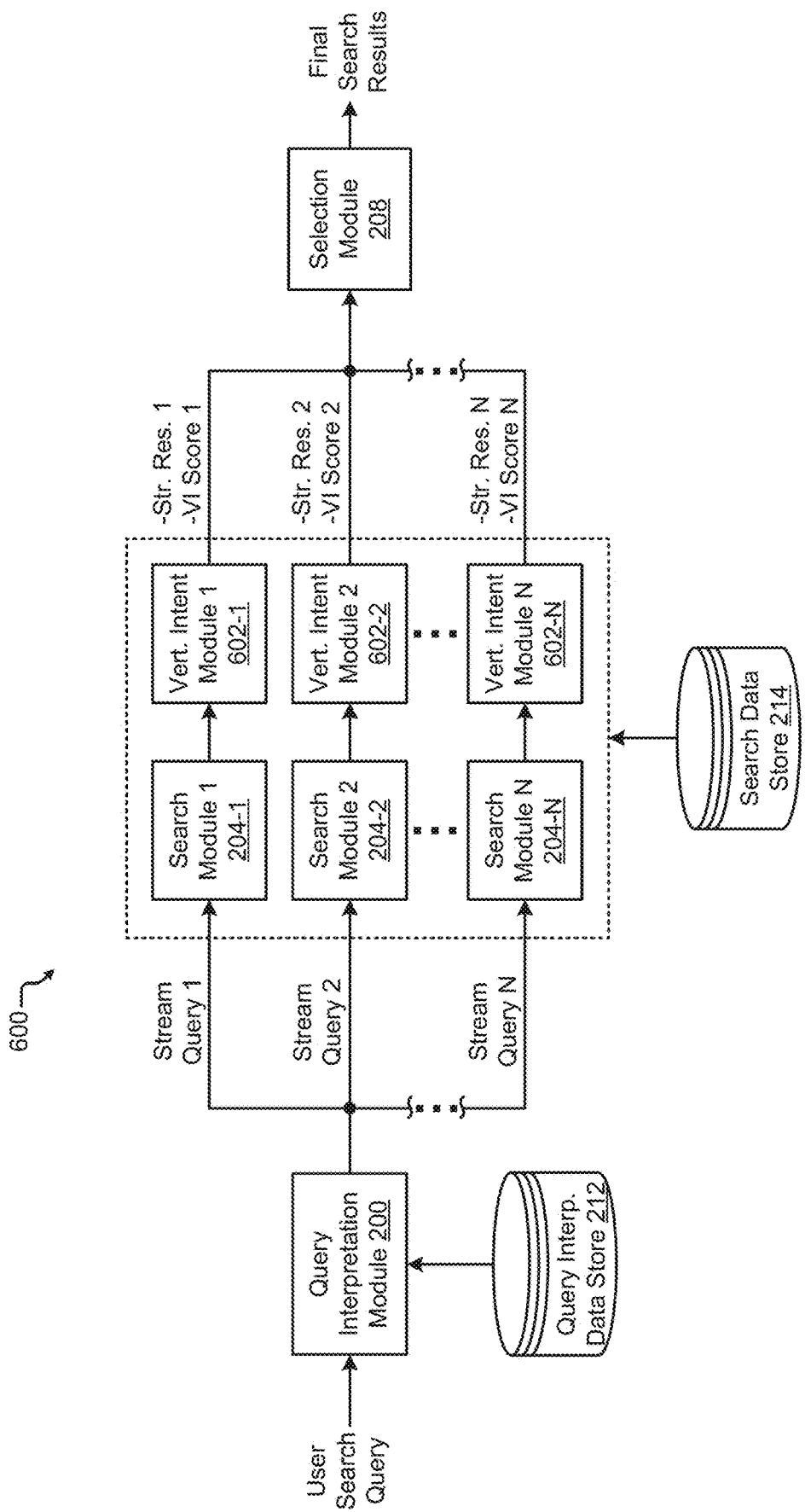
FIG. 6 is a functional block diagram of an example search system that includes vertical intent modules.

FIG. 6 illustrates an example search system 600 that may calculate a vertical intent score for each stream. In FIG. 6, the search system 600 includes vertical intent modules 602 for each stream that may calculate vertical intent scores. The vertical intent score may be a value that indicates the relevance of a search stream. For example, a vertical intent score may indicate whether the search results are relevant and align with a specific vertical (e.g., search category).

A vertical intent module 602 may calculate a single vertical intent score for each vertical of each stream (e.g., each vertical for each set of stream results). The vertical intent score may be used by the selection module 208 in the scoring and selection of streams. The vertical intent module 602 may generate a vertical intent score for each vertical in a stream based on one or more of the following: 1) the number of results in a vertical, 2) the relevance of the results in a vertical, 3) the popularity of the results in a vertical, and 4) the popularity of the applications associated with the results. The vertical intent module 602 may generate the vertical intent score using a function that takes into account any combination of the above factors. The vertical intent score may be a decimal score from 0.00-1.00 that indicates a level of vertical intent associated with the stream, where a higher vertical intent (e.g., closer to 1.00) indicates that the search results are more relevant and align with a specific vertical. In the case where a set of stream results includes results for multiple verticals, the selection module 208 may use the highest vertical intent score for the stream when determining whether to select stream results for inclusion into the final search results.

Higher vertical intent scores may be generated by a vertical intent scoring function for any one or more of the following: 1) a larger number of results in the same vertical, 2) highly relevant results (e.g., higher result scores), 3) more popular results, and 4) results associated with more popular applications. Alternatively, lower vertical intent scores may be generated by a vertical intent scoring function for one or more of the following: 1) results that are spread among different verticals, 2) low relevance results, 3) low popularity results, and 4) results associated with less popular applications. In some implementations, a vertical intent scoring function may take into account the number of application states (e.g., the distribution of application states) associated with a specific vertical. For example, verticals with fewer results (e.g., exclusive high-end dining results) may require fewer stream results for a higher vertical intent score than verticals with a greater number of results (e.g., all songs).

FIG. 7 illustrates an example selection module 208 that selects one or more results from one or more of the sets of stream results. For example, the selection module 208 may be configured select one or more entire sets of stream results for inclusion in the final search results. Although the selection module 208 may be configured to select one or more entire sets of stream results, in some implementations, the selection module 208 may be configured to select a subset of stream results from one or more sets of stream results for inclusion in the final search results.

The selection module 208 may be configured to select a stream based on any of the stream metadata and data associated with the individual results. For example, the selection module 208 may be configured to select a stream based on a variety of stream selection factors including, but not limited to: 1) stream result scores, 2) stream metadata (e.g., stream type and/or pre-search estimated stream confidence), 3) vertical intent scores, 4) popularity scores, 5) a number of results in each stream, 6) result types (e.g., prefer specific result types), 7) query properties (e.g., confidence scores), and 8) user data (e.g., installation status and/or usage).

The selection module 208 may include a stream score generation module 700 (hereinafter "stream scoring module 700") that generates a stream score for each stream. A stream score may indicate the relevance of the set of stream results as a whole (e.g., relevance to the user/stream query). In some implementations, the stream score may be a decimal score from 0.00-1.00, where a higher stream score (e.g., closer to 1.00) indicates a greater amount of relevance.

The stream scoring module 700 may generate a stream score based on any of the stream selection factors described above. For example, the stream score module may include a stream scoring function that determines a stream score based on one or more of: 1) stream result scores, 2) stream metadata (e.g., stream type and/or pre-search estimated stream confidence), 3) vertical intent scores, 4) popularity scores, 5) a number of results in each stream, 6) result types (e.g., prefer specific result types), 7) query properties (e.g., confidence scores), and 8) user data (e.g., installation status and/or usage). In some implementations, the stream scoring module 700 may include one or more machine learned models configured to receive one or more features and output stream scores.

Higher stream scores may be generated by a stream scoring function for any one or more of the following: 1) higher stream result scores in a stream, 2) preference for specific stream types, such as the original stream or application name streams, 3) higher vertical intent scores, 4) stream results with higher popularity scores, 5) a greater number of relevant/popular results, 6) a preference for result types, such as application open types for an application name stream, 7) queries with higher confidence scores, and 8) streams that include applications the user has installed and/or used recently.

In some implementations, the selection module 208 (e.g., result generation module 702) may select one or more streams based on the associated stream scores. For example, the result generation module 702 may select a stream with the highest associated stream score for insertion into the final search results. In cases where the result generation module 702 is configured to select a minimum number of results, the result generation module 702 may select more than one stream (e.g., the next highest scoring streams) to generate the minimum number of results.

The selection module 208 may implement a variety of stream selection operations. Example stream selection operations may include, but are not limited to, one or more of the following: 1) filtering operations (e.g., stream admissibility criteria), 2) preference/prioritization operations, and 3) stream scoring and/or weighting operations. Stream selection may be based on any of the selection factors/operations described herein. As such, example combinations of selection factors/operations described herein are only example selection factors/operations.

In some implementations, the selection module 208 may filter out (e.g., remove) streams and/or single results based on any of the factors. For example, the selection module 208 may filter out streams with no results or fewer than a threshold number of results. The selection module 208 may also filter out results that do not have minimum threshold values, such as stream scores, vertical intent scores, result scores, and/or popularity scores. In some implementations, the selection module 208 may implement minimum/maximum result thresholds for the final search results.

In some implementations, the selection module 208 may show preference to specific types of streams by boosting stream scores and/or weighting the stream scores for specific types of streams. For example, the selection module 208 may show preference to the original query stream. In this example, the stream scoring module 700 may boost the stream score for the original stream to reflect the preference for the original stream over other interpretations. In another example, the selection module 208 may show preference to application name streams that include result types that are application open results (e.g., tagged as application open results). In this example, the stream scoring module 700 may boost the stream score for an application name stream with application open results, as the result types in this case align with the stream type. The alignment of result type and stream type may be an indicator that the query interpretation aligns well with the user's search intent.

The selection module 208 may select streams based on user data, such as application installation status and/or usage data. For example, the stream scoring module 700 may boost stream scores for streams that include results for applications that are installed and/or used on the user device. As another example, the selection module 208 may filter out streams that do not include installed applications. As another example, the selection module 208 may filter out streams including applications that are not used frequently by the user. As another example, if streams have similar stream scores, the selection module 208 may select a stream with more installed/used applications.

Although the selection module 208 may score streams and select the stream(s) based on the stream scores, in some implementations, the selection module 208 may implement other operations for selecting streams. For example, the selection module 208 may implement other stream selection rules/logic for selecting the streams based on the stream factors. In one example, the selection module 208 may select a stream having the top N (e.g., three) most relevant and/or popular results.

Although the selection module 208 may process individual streams, in some implementations, the selection module 208 may be configured to group stream results together if the stream results are associated with the same stream types. For example, if multiple application name streams are generated, the selection module 208 may process the grouped streams as a single stream group. In one example, the stream scoring module 700 may generate a single stream score for the stream group. As another example, the result generation module 702 may select an entire group for generating the final search results.

Although the selection module 208 may select entire search streams, in other implementations, the selection module 208 may be configured to select individual results from the plurality of search streams. For example, the selection module 208 may be configured to select individual results based on one or more of: 1) stream result scores associated with the individual results, 2) stream metadata (e.g., stream type) associated with the individual results, 3) vertical intent scores associated with the individual results, 4) popularity scores of the individual results, 5) result types of the individual results (e.g., a preference for specific result types), 6) query properties associated with the individual results, and 7) user data associated with the individual results (e.g., installation status and/or usage).

In some implementations, the selection module 208 may be configured to select the top results (e.g., top N results) from each of multiple streams, and then order results in sequence. For example, the stream selection module 208 may keep the top 10 results of the highest scoring stream, followed by the top 10 results of the second highest scoring stream.

The result generation module 702 generates the set of final search results 210 (e.g., search results 210-1 to 210-X in FIG. 7). The final search results 210 may include a result object for each search result. Each result object 210 may include access data, a result score/rank, and/or display data. The user device 100 and/or search application 114 renders the final search results.

In FIG. 7, the user has entered a user search query "ama," which may be a partial search query. The search system 102 has returned final search results for four or more applications (e.g., additional links may be offscreen). It may be assumed that the stream yielding the rendered search results was an application name stream. The GUI of FIG. 7 indicates that the results are "App Search Results." The data for determining that the results are "App Search Results" may have been included in the final search result data (e.g., stream metadata associated with the final search result data). For example, stream type data (e.g., application name stream) sent in the final search results may have been used by the search application 114 to render the "App Search Results" header. Other stream types described herein may be sent to a user device to cause other header renderings. For example, a spell correction stream type may yield a "Spell Correction Results" header.

In FIG. 7, the search results are rendered as user-selectable links 704-1, 704-2, 704-3, 704-4 for the following applications: 1) the Amazon Shopping application, 2) the AMAZON PRIME® Video application, 3) the Amazon Music application, and 4) the AMAZON ALEXA® application. In FIG. 7, it may be assumed that the user device has the top three applications installed. Selection of any of the top three search results may result in the applications being opened to the application homepage (e.g., the results are application open types). It may be further assumed that the AMAZON ALEXA® application is not installed on the user device. As such, selection of the fourth search result (e.g., a download link) may access a page on a digital distribution platform for downloading and installing the AMAZON ALEXA® application.

FIG. 8 illustrates an example method that describes operation of the search system 102. In block 800, the query module 200 receives a user search query from a user device. In block 802, the query module 200 (e.g., query submodules 400) generates a plurality of stream queries. In block 804, the search modules 204 generate a set of stream results for each stream query.

In block 806, the selection module 208 generates a stream score for each set of stream results. In block 808, the selection module 208 selects one or more streams based on the stream scores. In block 810, the selection module 208 generates the set of final search results based on the selected one or more streams. In block 812, the search system 102 sends the set of final search results to the user device.

The data structures (e.g., search records) and data stores described herein are only example data structures and data stores. As such, the search system 102 may implement the techniques of the present disclosure using additional/alternative data structures and data stores.

Modules and data stores included in the search system 102 represent features that may be included in the search system 102 of the present disclosure. The modules and data stores described herein may be embodied by electronic hardware, software, firmware, or any combination thereof. Depiction of different features as separate modules and data stores does not necessarily imply whether the modules and data stores are embodied by common or separate electronic hardware or software components. In some implementations, the features associated with the one or more modules and data stores depicted herein may be realized by common electronic hardware and software components. In some implementations, the features associated with the one or more modules and data stores depicted herein may be realized by separate electronic hardware and software components.

The modules and data stores may be embodied by electronic hardware and software components including, but not limited to, one or more processing units, one or more memory components, one or more input/output (I/O) components, and interconnect components. Interconnect components may be configured to provide communication between the one or more processing units, the one or more memory components, and the one or more I/O components. For example, the interconnect components may include one or more buses that are configured to transfer data between electronic components. The interconnect components may also include control circuits (e.g., a memory controller and/or an I/O controller) that are configured to control communication between electronic components.

The one or more processing units may include one or more central processing units (CPUs), graphics processing units (GPUs), digital signal processing units (DSPs), or other processing units. The one or more processing units may be configured to communicate with memory components and I/O components. For example, the one or more processing units may be configured to communicate with memory components and I/O components via the interconnect components.

A memory component (e.g., main memory and/or a storage device) may include any volatile or non-volatile media. For example, memory may include, but is not limited to, electrical media, magnetic media, and/or optical media, such as a random access memory (RAM), read-only memory (ROM), non-volatile RAM (NVRAM), electrically-erasable programmable ROM (EEPROM), Flash memory, hard disk drives (HDD), magnetic tape drives, optical storage technology (e.g., compact disc, digital versatile disc, and/or Blu-ray Disc), or any other memory components.

Memory components may include (e.g., store) data described herein. For example, the memory components may include the data included in the data stores. Memory components may also include instructions that may be executed by one or more processing units. For example, memory may include computer-readable instructions that, when executed by one or more processing units, cause the one or more processing units to perform the various functions attributed to the modules and data stores described herein.

The I/O components may refer to electronic hardware and software that provides communication with a variety of different devices. For example, the I/O components may provide communication between other devices and the one or more processing units and memory components. In some examples, the I/O components may be configured to communicate with a computer network. For example, the I/O components may be configured to exchange data over a computer network using a variety of different physical connections, wireless connections, and protocols. The I/O components may include, but are not limited to, network interface components (e.g., a network interface controller), repeaters, network bridges, network switches, routers, and firewalls. In some examples, the I/O components may include hardware and software that is configured to communicate with various human interface devices, including, but not limited to, display screens, keyboards, pointer devices (e.g., a mouse), touchscreens, speakers, and microphones. In some examples, the I/O components may include hardware and software that is configured to communicate with additional devices, such as external memory (e.g., external HDDs).

In some implementations, the search system 102 may include one or more computing devices that are configured to implement the techniques described herein. Put another way, the features attributed to the modules and data stores described herein may be implemented by one or more computing devices. Each of the one or more computing devices may include any combination of electronic hardware, software, and/or firmware described above. For example, each of the one or more computing devices may include any combination of processing units, memory components, I/O components, and interconnect components described above. The one or more computing devices of the search system 102 may also include various human interface devices, including, but not limited to, display screens, keyboards, pointing devices (e.g., a mouse), touchscreens, speakers, and microphones. The computing devices may also be configured to communicate with additional devices, such as external memory (e.g., external HDDs).

The one or more computing devices of the search system 102 may be configured to communicate with the network 104. The one or more computing devices of the search system 102 may also be configured to communicate with one another (e.g., via a computer network). In some examples, the one or more computing devices of the search system 102 may include one or more server computing devices configured to communicate with user devices. The one or more computing devices may reside within a single machine at a single geographic location in some examples. In other examples, the one or more computing devices may reside within multiple machines at a single geographic location. In still other examples, the one or more computing devices of the search system 102 may be distributed across a number of geographic locations.

What is claimed is:

1. A method comprising:
   receiving a user search query from a user device;
   generating an application name stream query and an original stream query based on the user search query, wherein the application name stream query indicates an application name, and wherein the original stream query includes the user search query;
   generating stream metadata for each of the stream queries that indicates a type of the stream query, wherein the application name stream query is an application name type, and wherein the original stream query is an original stream type;
   for each stream query, identifying a set of search records based on matches between the stream query and data included in the search records;
   generating a stream result score for each set of search records based on the type of stream query used in identifying the set of search records;
   selecting one of the sets of search records based on the stream result scores;
   generating search results based on the selected search records, wherein the search results include access data for accessing application states on the user device; and
   sending the search results to the user device.

2. The method of claim 1, further comprising generating an additional stream query that is a different interpretation of the user search query than the application name stream query and the original stream query, wherein the additional stream query is an additional type.

3. The method of claim 2, wherein the user search query is a partially entered search query, wherein the additional stream query is a completion stream query that is a completion of the partially entered search query, and wherein the additional stream query is a completion type.

4. The method of claim 2, wherein the additional stream query is a spell correction stream query that is a spell correction of the user search query, and wherein the spell correction stream query is a spell correction type.

5. The method of claim 2, wherein the additional stream query is a synonym stream query that is a synonym of the user search query, and wherein the synonym stream query is a synonym type.

6. The method of claim 1, wherein the application name stream query includes search query text that is an application name.

7. The method of claim 1, wherein the application name stream query includes an application identifier, and wherein identifying a set of search records for the application name stream query includes filtering the set of search records based on the application identifier.

8. The method of claim 1, wherein a plurality of search records include an application open type tag that indicates the search records produce search results that open an application homepage, and wherein generating a stream result score for the set of search records associated with the application name stream query includes boosting the stream result score based on the inclusion of search records that include the application open type tag.

9. The method of claim 1, further comprising:
generating a relevance score for each search record that indicates the relevance of the search record to the stream query used to identify the search record; and
generating the stream result score for each set of search records based on the relevance scores of the search records.

10. The method of claim 1, wherein each of the search records includes a vertical tag that indicates a category of content associated with the search record, the method further comprising:
determining a vertical intent score for each set of search records based on a number of search records in the set associated with a single vertical and based on relevance of the search records associated with the single vertical; and
for each set of search records, generating the stream result score based on the associated vertical intent score for the set of search records.

11. The method of claim 1, wherein each stream result score indicates a relevance of the set of search records to the stream query used in identifying the set of search records.

12. The method of claim 1, wherein the stream queries are generated in parallel, and wherein the sets of search records are identified in parallel.

13. A system comprising:
one or more storage devices configured to store a plurality of search records; and
one or more processing units that execute computer-readable instructions that cause the one or more processing units to:
receive a user search query from a user device;
generate an application name stream query and an original stream query based on the user search query, wherein the application name stream query indicates an application name, and wherein the original stream query includes the user search query;
generate stream metadata for each of the stream queries that indicates a type of the stream query, wherein the application name stream query is an application name type, and wherein the original stream query is an original stream type;
for each stream query, identify a set of search records based on matches between the stream query and data included in the search records;
generate a stream result score for each set of search records based on the type of stream query used in identifying the set of search records;
select one of the sets of search records based on the stream result scores;
generate search results based on the selected search records, wherein the search results include access data for accessing application states on the user device; and
send the search results to the user device.

14. The system of claim 13, wherein the one or more processing units are configured to generate an additional stream query that is a different interpretation of the user search query than the application name stream query and the original stream query, wherein the additional stream query is an additional type.

15. The system of claim 14, wherein the user search query is a partially entered search query, wherein the additional stream query is a completion stream query that is a completion of the partially entered search query, and wherein the additional stream query is a completion type.

16. The system of claim 14, wherein the additional stream query is a spell correction stream query that is a spell correction of the user search query, and wherein the spell correction stream query is a spell correction type.

17. The system of claim 14, wherein the additional stream query is a synonym stream query that is a synonym of the user search query, and wherein the synonym stream query is a synonym type.

18. The system of claim 13, wherein the application name stream query includes search query text that is an application name.

19. The system of claim 13, wherein the application name stream query includes an application identifier, and wherein identifying a set of search records for the application name stream query includes filtering the set of search records based on the application identifier.

20. The system of claim 13, wherein a plurality of search records include an application open type tag that indicates the search records produce search results that open an application homepage, and wherein generating a stream result score for the set of search records associated with the application name stream query includes boosting the stream result score based on the inclusion of search records that include the application open type tag.

21. The system of claim 13, wherein the one or more processing units are configured to:
generate a relevance score for each search record that indicates the relevance of the search record to the stream query used to identify the search record; and
generate the stream result score for each set of search records based on the relevance scores of the search records.

22. The system of claim 13, wherein each of the search records includes a vertical tag that indicates a category of content associated with the search record, and wherein the one or more processing units are configured to:
determine a vertical intent score for each set of search records based on a number of search records in the set associated with a single vertical and based on relevance of the search records associated with the single vertical; and
for each set of search records, generate the stream result score based on the associated vertical intent score for the set of search records.

23. The system of claim 13, wherein each stream result score indicates a relevance of the set of search records to the stream query used in identifying the set of search records.

24. The system of claim 13, wherein the stream queries are generated in parallel, and wherein the sets of search records are identified in parallel.

* * * * *